(12) United States Patent
Ho et al.

(10) Patent No.: US 7,603,747 B2
(45) Date of Patent: Oct. 20, 2009

(54) ROTATING SHAFT STRUCTURE WITH AUTOMATIC LOCKING MECHANISM

(75) Inventors: Chi-Jung Ho, Sinjhuang (TW); Chih-Huang Peng, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 569 days.

(21) Appl. No.: 11/455,681

(22) Filed: Jun. 19, 2006

(65) Prior Publication Data
US 2007/0169312 A1     Jul. 26, 2007

(30) Foreign Application Priority Data
Jan. 26, 2006   (TW) .............................. 95201800 U

(51) Int. Cl.
*E05D 11/10* (2006.01)
(52) U.S. Cl. .......................................... 16/330; 16/340
(58) Field of Classification Search ............... 16/340, 16/337–339, 367, 330, 303; 361/680–683, 361/814; 248/919, 920–923; 455/575.1, 455/575.4, 575.8, 550.1, 90.3
See application file for complete search history.

(56) References Cited

U.S. PATENT DOCUMENTS

| | | | | |
|---|---|---|---|---|
| 5,109,570 A * | 5/1992 | Okada et al. .................. | 16/289 |
| 5,269,047 A * | 12/1993 | Lu ............................... | 16/340 |
| 6,163,928 A * | 12/2000 | Chung ......................... | 16/342 |
| 6,421,878 B1 * | 7/2002 | Kaneko et al. ................ | 16/330 |
| 6,618,903 B2 * | 9/2003 | Kim ............................. | 16/337 |
| 6,779,234 B1 * | 8/2004 | Lu et al. ....................... | 16/340 |
| 6,813,813 B2 * | 11/2004 | Lu et al. ....................... | 16/342 |
| 6,862,779 B1 * | 3/2005 | Lu et al. ....................... | 16/340 |
| 7,082,642 B2 * | 8/2006 | Su ............................... | 16/340 |
| 7,251,129 B2 * | 7/2007 | Lee et al. ..................... | 361/683 |
| 2005/0235459 A1 * | 10/2005 | Amano ........................ | 16/330 |
| 2007/0136992 A1 * | 6/2007 | Lu et al. ....................... | 16/330 |

* cited by examiner

*Primary Examiner*—Chuck Y. Mah
(74) *Attorney, Agent, or Firm*—Guice Patents PLLC

(57) ABSTRACT

The present invention discloses a rotating shaft structure with automatic locking mechanism, characterized in which a shaft extending axially from an axial member passes through, in sequence, the core hole of the upright frame plane of the main frame, a friction disc, a disc-like connecting part connected with the frame plane, a cam member comprising a fastening part and a sliding part, at least an elastic body, and a connecting segment on the free end of the shaft connected with a end enclosure so as to form axial pressure to constrain the elements described above. The shaft and the main frame are provided with a linking portion and a connecting portion, respectively. The outer and inner edges of the adjoining planes between the fastening part and the sliding part are provided with at least a wedge block and at least a wedge slot alternately so as to connect the fastening part and the sliding part together. Consequently, when the axial member rotates, the inclined plane of the wedge slot of the sliding part moves upward along the inclined plane of the wedge block and thus axially presses the elastic body so as to prompt the contact plane of the sliding part to rotate along the wedge blocks of the fastening part. When the axial member rotates reversely, the wedge slots of the sliding part move to the wedge blocks of the fastening part and, under the extending action of the elastic body, the wedge slots are engaged into the wedge blocks so as to form an automatic locking of butting joint.

11 Claims, 8 Drawing Sheets

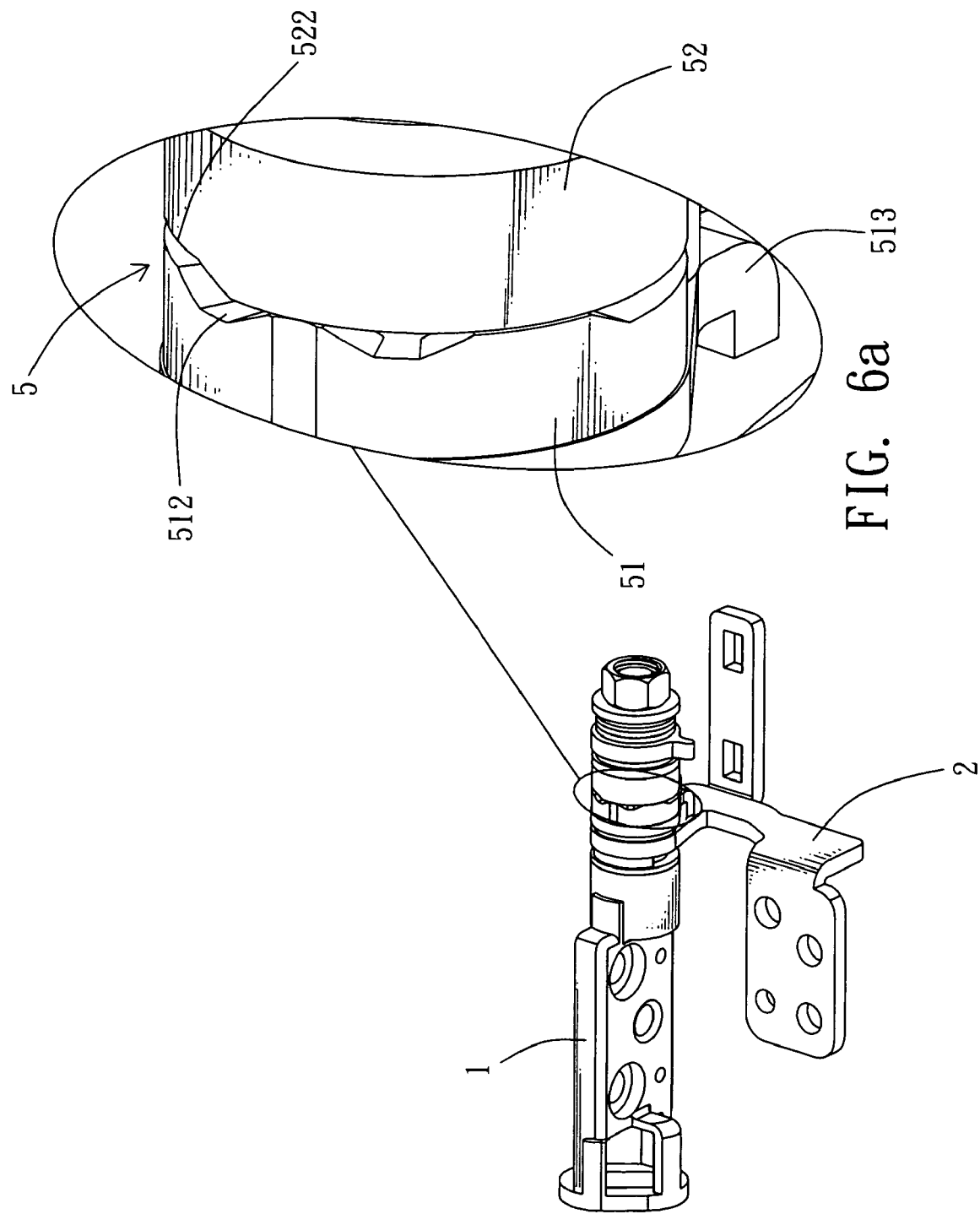

ROTATING SHAFT STRUCTURE WITH AUTOMATIC LOCKING MECHANISM

FIELD OF THE INVENTION

The present invention relates to a rotating shaft structure, and particularly to a rotating shaft structure with automatic locking mechanism, in which a friction disc arranged between the main frame and the connecting part to significantly increase the service life of the rotating shaft structure.

BACKGROUND OF THE INVENTION

Consumer electronics with flip covers, such as portable computer, electronic dictionary, portable audio/video player, flip mobile phone, generally has a main body on the bottom, which is pivotally connected with the cover on the top, such that the cover may swing open or close with respect to the main body. Consequently, the rotating shaft is key to the quality of the products described above. In fact, the design for a good rotating shaft requires a limit on movement angle as well as a necessary arresting effect.

To prevent the main body and the cover of the 3C electronic products described above from swinging open arbitrarily, at least a sliding or pressing switch is provided at the respective limit of the movement angle such that the switch may be used to fold them together to close down during swinging close. However, for this type of automatic locking mechanism, the rotating shaft structure with automatic locking mechanism has to be provided with corresponding holes and locking elements, leading to an increase in the complexity for assembly and the manufacturing cost. It is therefore necessary to provide a new design to overcome the drawbacks described above.

SUMMARY OF THE INVENTION

With long time experience in designing, production, and marketing of the rotating shaft, the applicant proposes the present "rotating shaft structure with automatic locking mechanism" after numerous experiments and testings in order to overcome many drawbacks, the lack of locking function for example, of the conventional prior art and thus to provide automatic locking mechanism and extend service life for the rotating shaft structure.

In order to accomplish the objects described above, the present invention provides a rotating shaft structure with automatic locking mechanism, characterized in which a shaft extending axially from an axial member passes through, in sequence, the core hole of the upright frame plane of the main frame, a friction disc, a disc-like connecting part connected with the frame plane, a cam member comprising a fastening part and a sliding part, at least an elastic body, and a connecting segment on the free end of the shaft connected with a end enclosure so as to form axial pressure to constrain the elements described above. The shaft and the main frame are provided with a linking portion and a connecting portion, respectively. The outer and inner edges of the adjoining planes between the fastening part and the sliding part are provided with at least a wedge block and at least a wedge slot alternately so as to connect the fastening part and the sliding part together. Consequently, when the axial member rotates, the inclined plane of the wedge slot of the sliding part moves upward along the inclined plane of the wedge block and thus axially presses the elastic body so as to prompt the contact plane of the sliding part to rotate along the wedge blocks of the fastening part. When the axial member rotates reversely, the wedge slots of the sliding part move to the wedge blocks of the fastening part and, under the extending action of the elastic body, the wedge slots are engaged into the wedge blocks so as to form an automatic locking of butting joint.

Another object of the present invention is to provide a rotating shaft structure with automatic locking mechanism, wherein the linking portion is insertingly engaged into the connecting hole on the end plane of a pivotal part and secured onto an object by at least an axial hole, and the connecting portion is provided with at least a connecting hole, through which the securing part is secured onto another object.

Yet another object of the present invention is to provide a rotating shaft structure with automatic locking mechanism, wherein a tenon is protrudingly provided on the connecting part corresponding to the tenon slot on the frame plane to insertingly engage into the tenon slot such that the connecting part and the frame plane may compressively grip the friction disc therebetween. Furthermore, the connecting part is radially cut to form a tenon hole and the fastening part is protrudingly provided with a protruding tenon such that the tenon may be insertingly engaged into the tenon hole and thus the connecting part and the fastening part are connected together.

Still yet another object of the present invention is to provide a rotating shaft structure with automatic locking mechanism, wherein the adjoining planes of the frame plane and the connecting part with the friction disc are provided with oil holes in a ring-like pattern and the friction disc is at least provided with two oil holes to accommodate lubricating grease.

Still another object of the present invention is to provide a rotating shaft structure with automatic locking mechanism, wherein three wedge blocks and three wedge slots are provided on the inner and outer edges, and the center of the blocks and slots have a smaller radian.

Still yet another object of the present invention is to provide a rotating shaft structure with automatic locking mechanism, wherein a stop block is provided around the core hole of the main frame adjacent to the axial member and a stop part is socketingly connected and linking-up with the shaft such that the radially protruding double stop edge contacts against the stop block to limit the angle movement.

Still yet another object of the present invention is to provide a rotating shaft structure with automatic locking mechanism, further comprising a trigger which is socketingly connected and linked up with the shaft. The trigger radially protrudes to form a protruding ear, which can contact with a control device when the protruding ear is rotated to a certain degree.

BRIEF DESCRIPTION OF THE DRAWINGS

The present invention can be more fully understood by reference to the following description and accompanying drawings, in which:

FIG. 6a and FIG. 6b schematically illustrate the perspective views of the present invention at locking conditions.

DETAILED DESCRIPTION OF THE INVENTION

Figure 1:
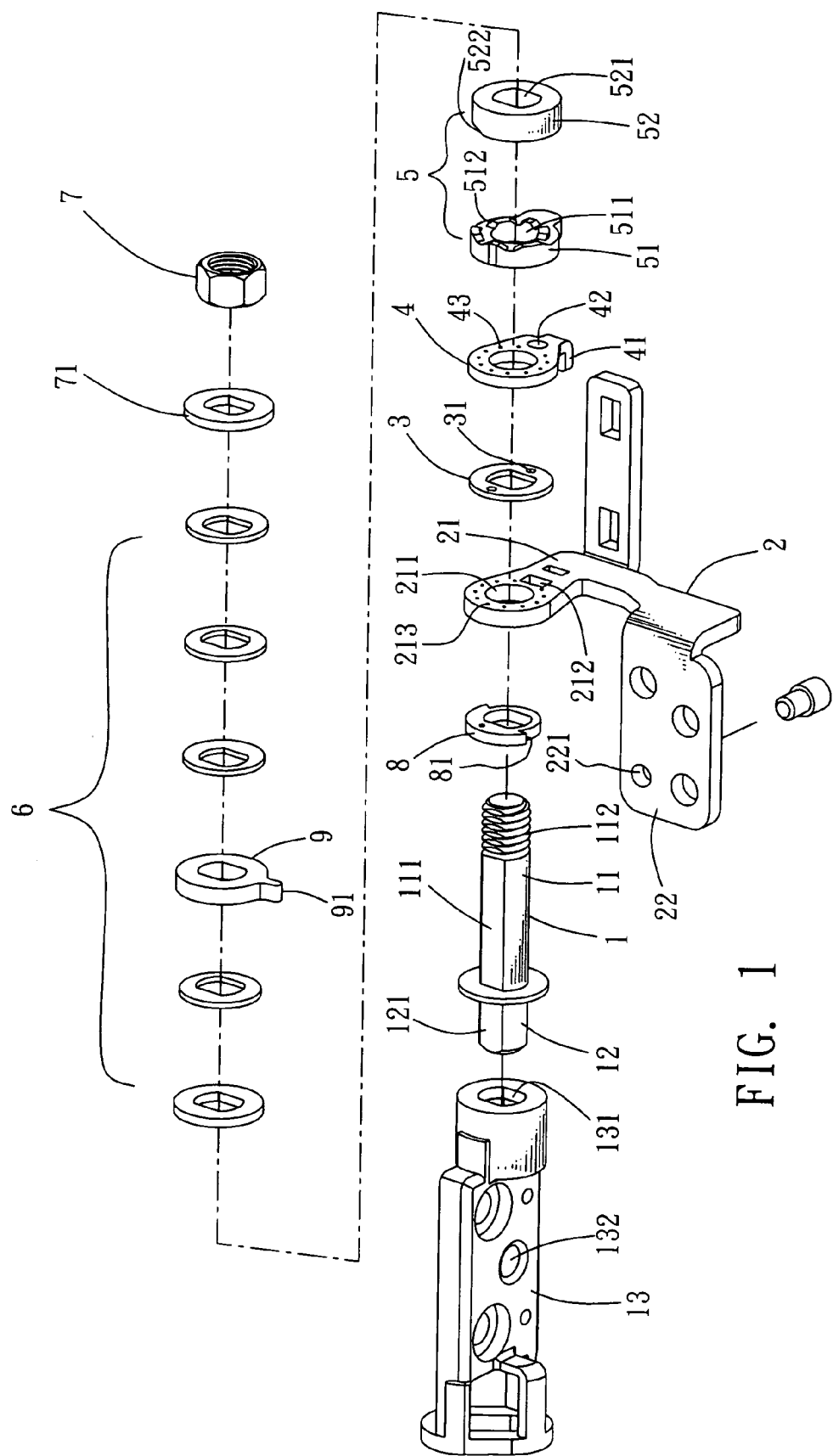
FIG. 1 schematically illustrates the exploded perspective view of a preferred embodiment of the rotating shaft structure with automatic locking mechanism according to the present invention.
Figure 2:
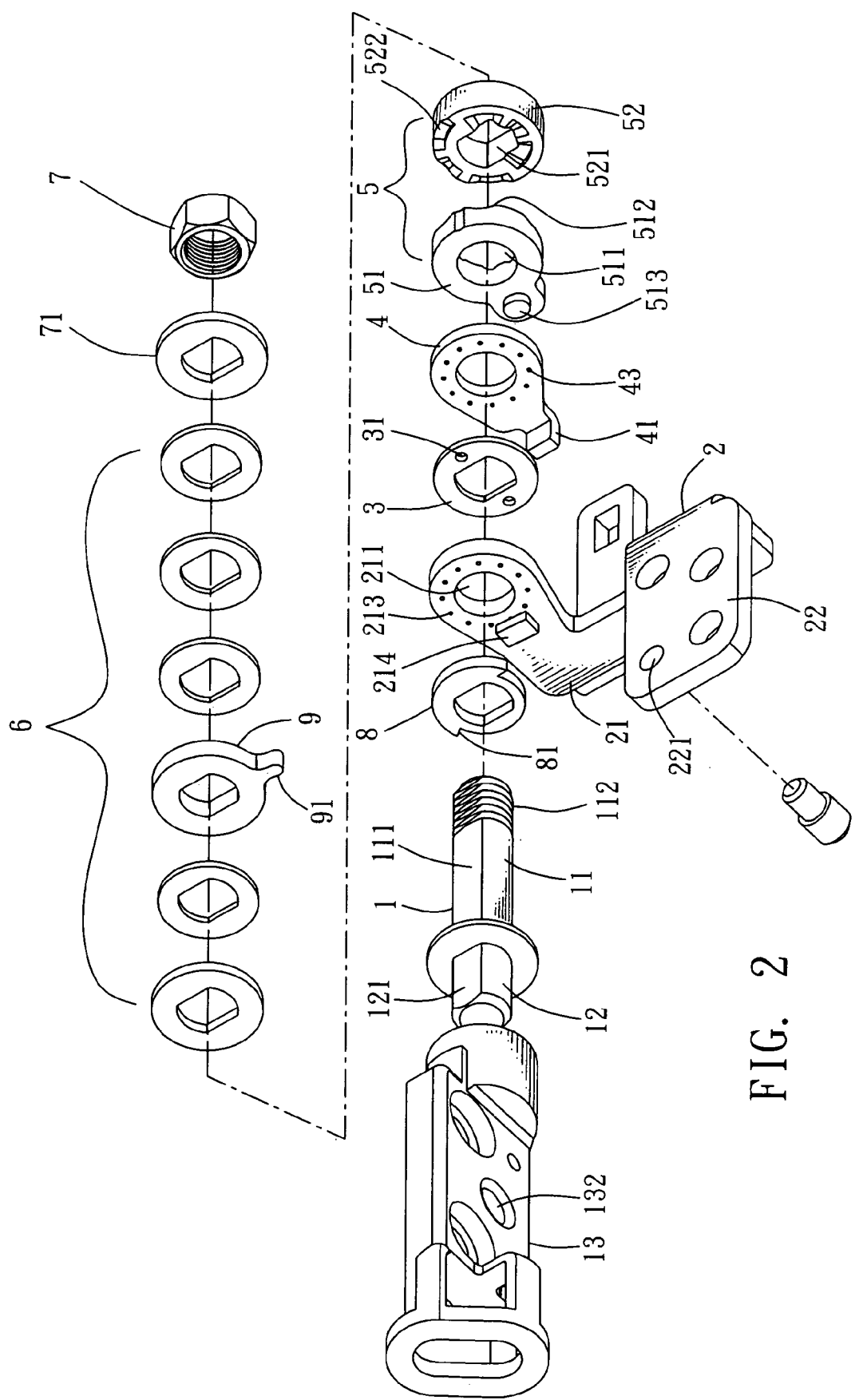
FIG. 2 schematically illustrates the exploded perspective view of the present invention along a different view angle.

Referring to FIGS. 1 to 5, a rotating shaft structure according to the present invention comprises an axial member 1, a main frame 2, a friction disc 3, a connecting part 4, a cam member 5, at least an elastic body 6, and an end enclosure 7.

The axial member 1 is a rod comprising a shaft 11 and a linking portion 12. The shaft 11 comprises at least a milling plane 111 to be socketingly connected with the friction disc 3 and the sliding part 52 of the cam member 5 so as to move simultaneously with the shaft 11. Furthermore, the shaft 11 extends from its free end to form a connecting segment 112 to be connected with the end enclosure 7 described later so as to prevent the elements described later from coming off axially.

The linking portion 12 is connected with an object, a cover for example, as shown in the figures. The linking portion 12 includes a connecting rid 121 provided with a milling plane so as to be insertingly engaged with the cover. However, the connection is not limited to the method described above. The linking portion 12 may be cut to form a hole, through which a conventional fastener, a screw for example, is inserted and secured onto the cover. As shown in the figures, the linking portion 12 according to the present invention is insertingly engaged into the receiving hole 131 on the end plane of the rod-like pivotal part 13 and secured onto the cover by at least an axial hole 132.

The main frame 2 is a framework whose upright frame plane 21 is provided with a core hole 211 through which the shaft 11 passes. A tenon slot 212 and a plurality of oil holes 213 arranged in circle are provided around the circumference of the core hole 211 for the insertingly engaged and located such that the connecting part 4 may be secured onto one side of the main frame 2 and the friction disc 3 described later may be clipped therebetween. Furthermore, the main frame 2 is further provided with a connecting portion 22, which is secured onto another object, the main body for example, as shown in the figures. The connecting portion 22 is at least provided with a connecting hole 221, through which a conventional fastener, a screw for example, is inserted and secured onto the main body. However, the connection between the connecting portion 22 and the object is not limited to the method described above. The connection may be achieved by inserting and engaging, which is also considered within the scope of the present invention.

The friction disc 3 is a copper disc adjoined with the core hole 221 of the frame plane 21. The shaft 11 is inserted through and linked up the friction disc 3 such that the contact planes of the friction disc 3 adjoined with the frame plane 21 and the connecting part 4 generate a frictional torque. The perimeter of the friction disc 3 is provided with at least two oil holes 31 to accommodate lubricating grease, so as to provide lubrication.

The connecting part 4 is a disc through which the shaft 11 passes and which is protrudingly provided with a tenon 41 on the location corresponding to the tenon slot 212 of the frame plane 21 such that the tenon 41 may be insertingly engaged into the tenon slot 212. Furthermore, the connecting part 4 is cut to form a tenon hole 42 and the plane of the connecting part 4 adjoining with the friction disc 3 is also provided with a plurality of oil holes 43 arranged in circle to accommodate lubricating grease, such that the planes between the connecting part 4 and the friction disc are well-lubricated.

Figure 3A:
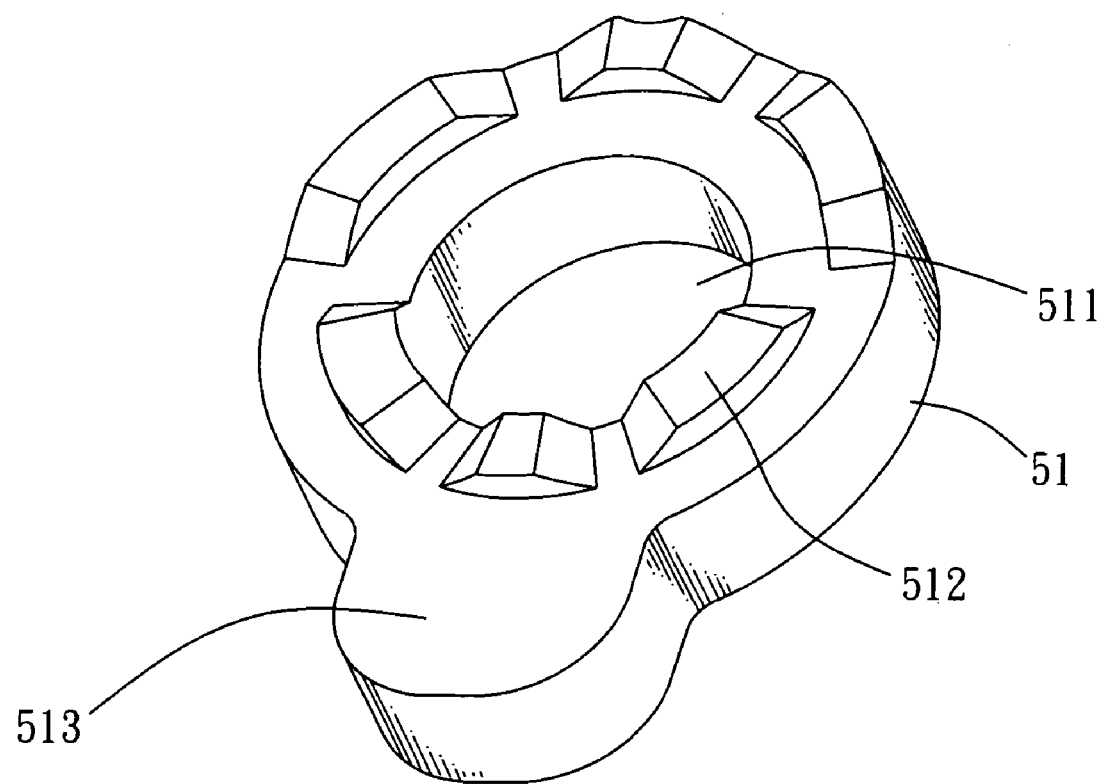
FIG. 3a and FIG. 3b schematically illustrate the perspective views of the cam member according to the present invention.
Figure 3B:
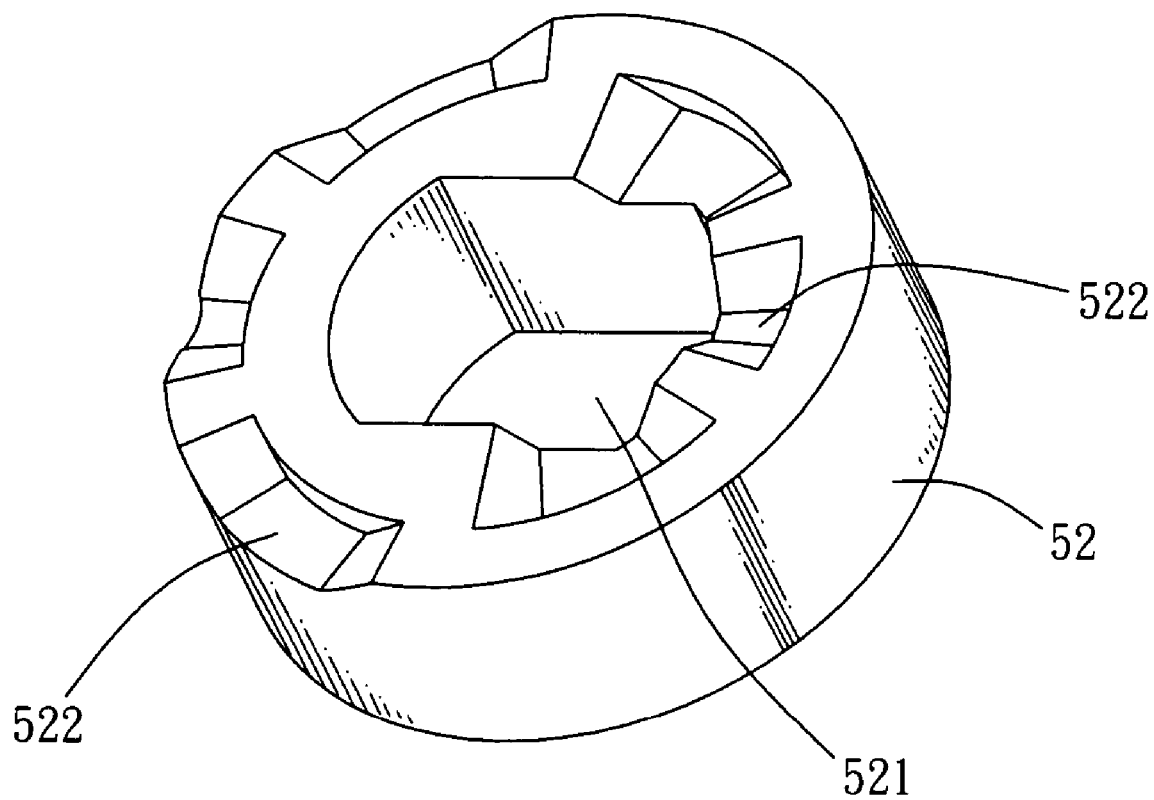
Figure 4:
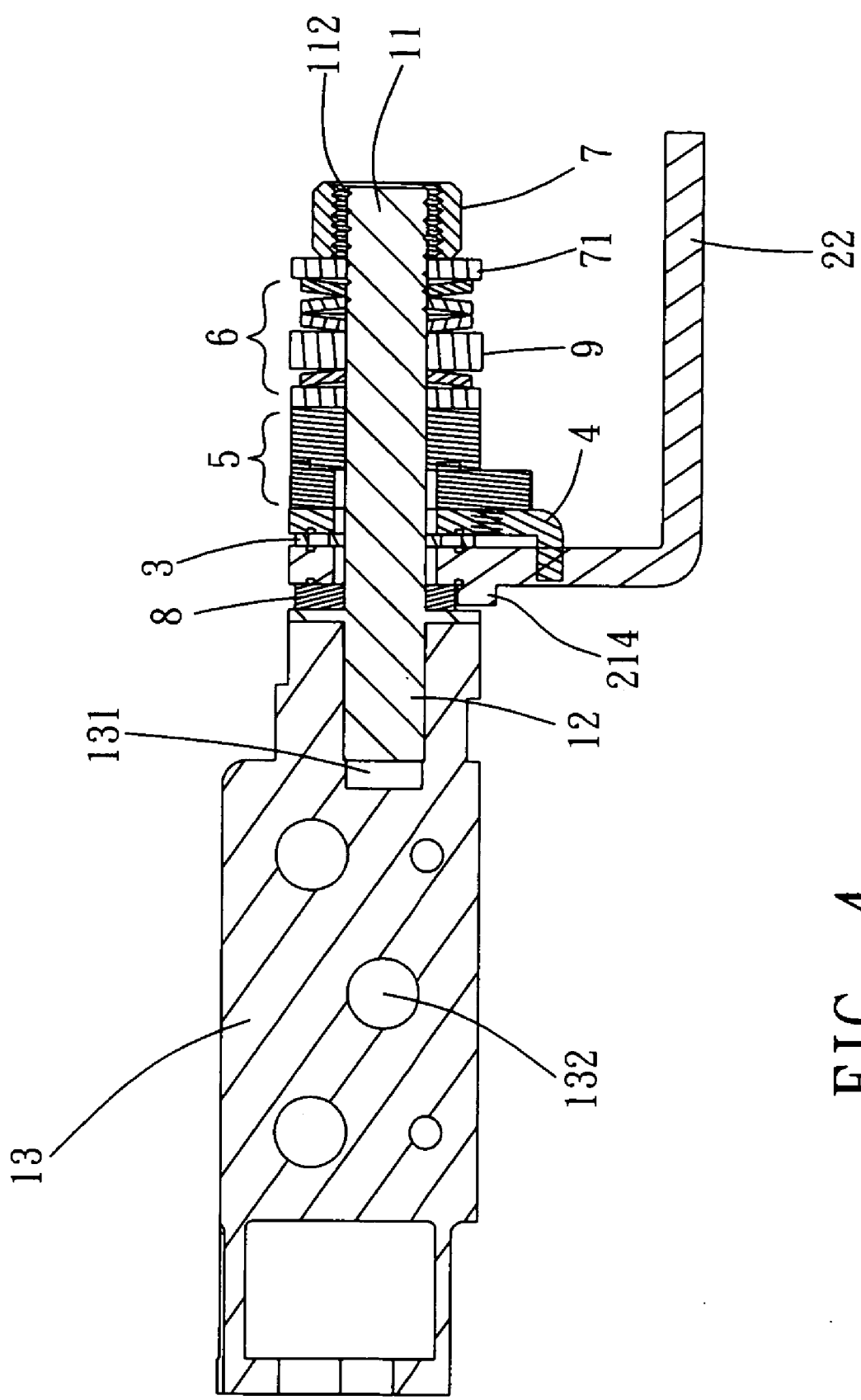
FIG. 4 schematically illustrates the cross-sectional assembly view of the present invention.
Figure 5:
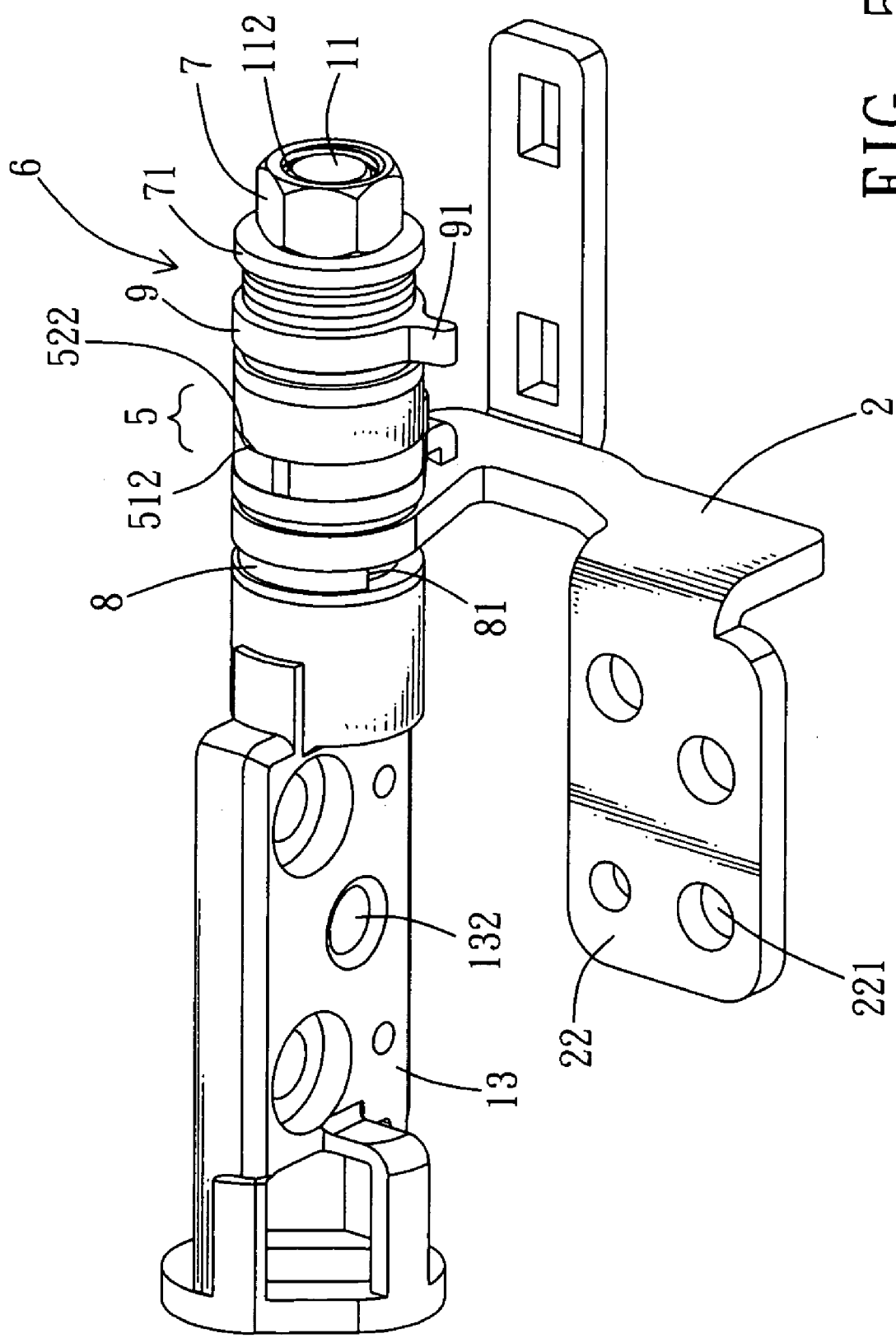
FIG. 5 schematically illustrates the perspective assembly view of the present invention.

Referring to FIGS. 3a and 3b, the cam member 5 comprises the fastening part 51 and the sliding part 52. Their inner and outer edges are provided with alternately interference structure of identical timing such that the fastening part 51 and the sliding part 52 are buttingly connected. The securing part 51 and the sliding part 52 are cut to form an axial hole 511 and a through hole 521, respectively, through which the shaft 11 passes. The through 521 is provided with a flat plane at the location corresponding to the milling plane 111 of the shaft 11 such that the through hole 521 and the shaft 11 may be linked up to move simultaneously. Furthermore, the external and inner edges of the adjoining planes between the fastening part 51 and the sliding part 52 are alternately provided with at least a wedge block and at least a wedge slot so as to connect the fastening part 51 and the sliding part 52 together in the inactivated condition.

Referring the figures, three wedge blocks 512 and three wedge slots 522 are provided on the inner and outer edges. The center of the blocks and slots having a smaller radian is to prevent, when the sliding part 52 is rotating, the wedge slot 522 on the outer edge at the process of moving to the central wedge slot 522 from being trapped therein and not able to rotate smoothly. The aim to provide three wedge blocks 512 and three wedge slots 522 is distribute the force of a single wedge slot 522 along the inclined surface of the wedge block 512 and thus to achieve the effect of saving force. Moreover, the fastening part 51 is secured onto the connecting part 4 by insertingly engaging the protruding tenon 513 into the tenon hole 42, for example.

The elastic body 6 is socketingly connected with the shaft 11 such that the sliding part 52 may move on the shaft 11 axially. The elastic body 5 is, for example but not limited to, a elastic disc, which may also be a wave-like elastic disk or spring to provide the same function.

The end enclosure 7 is connected with the connecting segment 112 of the shaft 11 to constrain the element described above and prevent them from coming off the shaft 11 axially. The end enclosure 7 is a lock nut in practice.

Figure 6B:
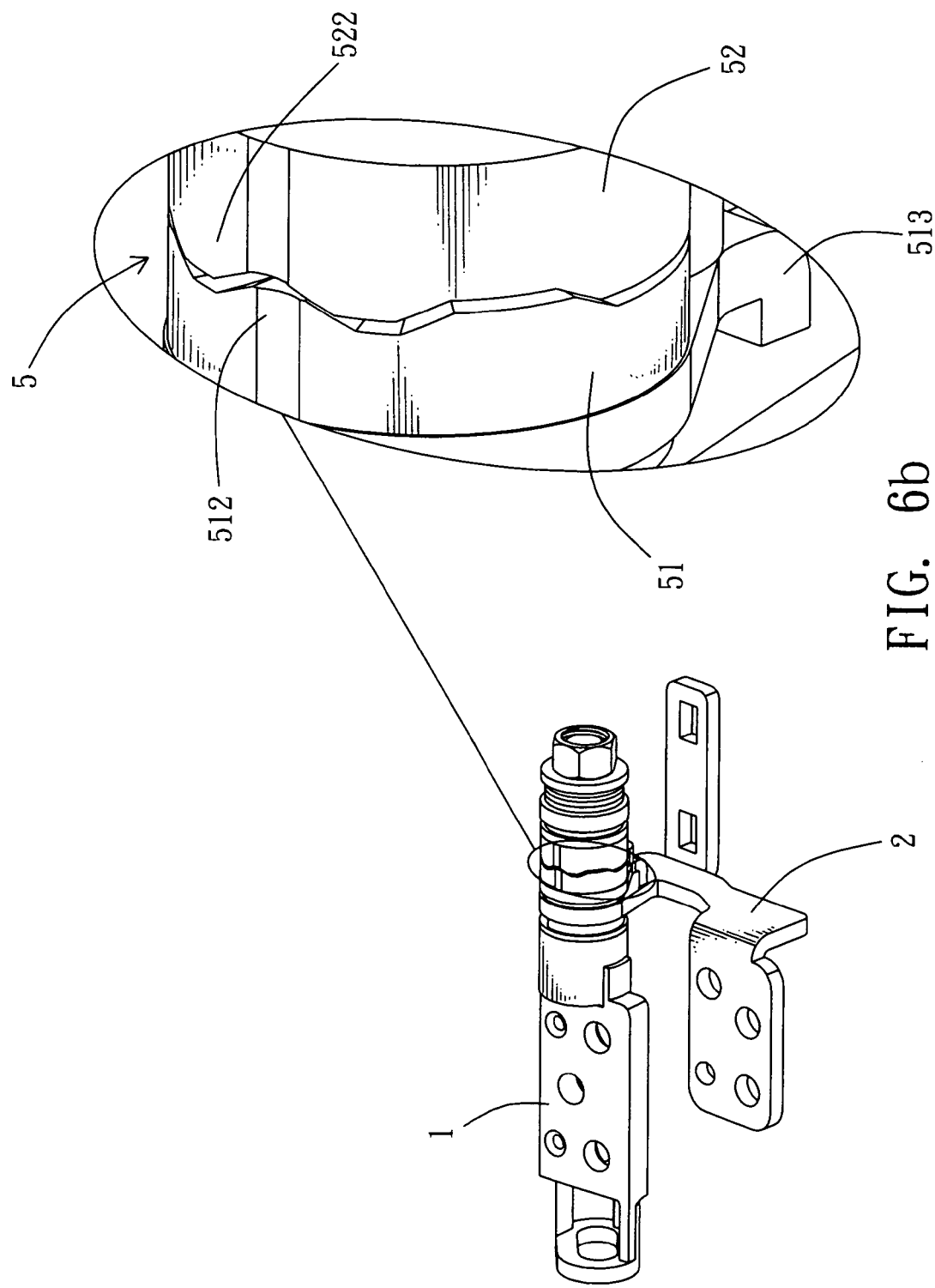

When the axial member 1 rotates and in the mean time the contact plane of the sliding part 52 rotates along the wedge blocks 512 of the fastening part 51 to generate an axial compression on the elastic body 6. Whereas, when the wedge slots 522 of the sliding part 52 moves to the wedge blocks 512 of the fastening part 51, as shown in FIG. 6b, the wedge slots 522 are engaged into the wedge block 512, under the extending action of the elastic body 6, to form an automatic locking of butting joint.

Consequently, by putting the present invention into practice, the functions of automatic locking and unlocking can be obtained by the engaging and disengaging of the special cam member of identical timing on the inner and outer edges, so as to avoid the difficulty and inconvenience of arranging a switch. Furthermore, to have the start and finish on rotating limits of the main frame 2, a stop block 214 is protrudingly provided around the core hole 211 on the main frame 2 adjacent to the axial member 1 and a stop part 8 is socketingly connected and linked up with the connecting segment 112 on the free end of the shaft 11, such that the radially protruding double stop edge 81 contacts against the stop block 214 to limit the angle movement of opening and closing.

Furthermore, the present invention further comprises a trigger 9 provided between the cam member 6 and the elastic body 6 to be socketingly connected and linked up with the shaft 11. The trigger 9 radially protrudes to form a protruding ear 91, which, when the shaft 1 rotates to a certain degree, can contact with a control device, a contact switch for example, to render the display screen on the cover into sleep mode.

Referring to FIGS. 1 to 5, when the present invent is being assembled, the shaft 11 passes through, in sequence, the stop part 8, the core hole 211 of the main frame 2, the friction disc 3, the connecting part 4, the fastening part 51, the sliding part 52, the trigger 9, the washer 71, the elastic body 6, and the washer 71, and the end enclosure 6 connected with the connecting segment 112 on the free end to complete the assembly.

Referring to FIG. 6a, when the cover is swung to close, the "light, thin, short, small" electronic products can be operated. Furthermore, the friction disc, provided between the main frame and the connecting part, and its adjoining members are provided with oil holes to significantly increase the service life of the rotating shaft structure.

While the invention has been described with reference to the a preferred embodiment thereof, it is to be understood that modifications or variations may be easily made without departing from the spirit of this invention, which is defined by the appended claims.

What is claimed is:

1. A rotating shaft structure with automatic locking mechanism comprising:
    a) an axial member having a shaft and a linking portion, the shaft has a connecting segment located on a free end thereof;
    b) a main frame having a frame plane and a connecting portion, the frame plane has a core hole;
    c) a friction disc;
    d) a connecting part connected to the frame plane;
    e) a cam member having a fastening part and a sliding part;
    f) at least one elastic body; and
    g) an end closure connected to the connecting segment of the shaft connected with a end enclosure and forming axial pressure to constrain the main frame, the friction disc, the connecting part, the cam member, and the at least one elastic body,
    wherein the shaft is sequentially inserted through the core hole of the upright frame plane of the main frame, the friction disc, the connecting part, the fastening part, the sliding part, the at least one elastic body, and the end closure;
    wherein outer and inner edges of adjacent surfaces of the fastening part and the sliding part are respectively provided with at least one wedge block and at least one wedge slot alternately so as to connect the fastening part and the sliding part together;
    wherein, when the axial member rotates in a first direction, the inclined plane of the wedge slot of the sliding part moves upward along the inclined plane of the wedge block and thus axially presses the elastic body thereby prompting the contact plane of the sliding part to rotate along the wedge blocks of the fastening part;
    wherein, when the axial member rotates in a second direction being opposite to the first direction, the at least one wedge slot of the sliding part moves to the at least one wedge block of the fastening part and, the elastic body pressing the at least one wedge slot to engage the at least one wedge block forming an automatic locking of butting joint.

2. The device according to claim 1, further comprising a pivotal part having at least one axial hole and a connecting hole, the linking portion is insertingly engaged into the connecting hole on an end of the pivotal part.

3. The device according to claim 1, wherein the connecting portion has at least one connecting hole for securing the connecting part to an object.

4. The device according to claim 1, wherein the frame plane has a tenon slot, the connecting part has a tenon inserted into the tenon slot, the connecting part and the frame plane compressively gripping the friction disc therebetween.

5. The device according to claim 1, wherein the connecting part has a tenon hole and the fastening part has a protruding tenon extending outwardly from a surface opposite the at least one wedge block, the protruding tenon being inserted into the tenon hole thereby connecting the connecting part and the fastening part.

6. The device according to claim 1, wherein the frame plane has a tenon slot, the connecting part has a tenon and a tenon hole, the tenon of the connecting part is inserted into the tenon slot, the friction disc being compressively gripped between the connecting part and the frame plane, the fastening part has a protruding tenon extending outwardly from a surface opposite the at least one wedge block, the protruding tenon being inserted into the tenon hole of the connecting part thereby connecting the connecting part and the fastening part.

7. The device according to claim 1, wherein the adjacent surfaces of each of the fastening part and the sliding part have oil holes positioned in a ring-like pattern and the friction disc has at least two oil holes.

8. The device according to claim 1, wherein the elastic body is selected from a group consisting of a spring, a wave-like elastic disk, and a disc spring.

9. The device according to claim 1, wherein the at least one wedge block of the fastening part includes three wedge blocks, and the at least one wedge slot of the sliding part includes three wedge slots.

10. The device according to claim 1, further comprising a stop part having double stop edge contacts, the shaft being inserted through the stop part, the frame plane has a stop block spaced apart from the core hole of the main frame and located adjacent to the axial member, wherein one of the double stop edge contacts of the stop part selectively engaging the stop block and limiting an angle of movement.

11. The device according to claim 1, further comprising a trigger having a protruding ear, the shaft being inserted through the trigger, the ear selectively contacting a control device when the protruding ear is rotated to a predetermined position.

* * * * *